(12) United States Patent
McCoy

(10) Patent No.: US 8,882,132 B2
(45) Date of Patent: Nov. 11, 2014

(54) REMOVABLE GOOSENECK HITCH SAFETY CHAIN BRACKET

(71) Applicant: Cequent Performance Products, Inc., Plymouth, MI (US)

(72) Inventor: Richard W. McCoy, Granger, IN (US)

(73) Assignee: Cequent Performance Products, Inc., Plymouth, MI (US)

( * ) Notice: Subject to any disclaimer, the term of this patent is extended or adjusted under 35 U.S.C. 154(b) by 0 days.

(21) Appl. No.: 13/833,595

(22) Filed: Mar. 15, 2013

(65) Prior Publication Data

US 2014/0265245 A1    Sep. 18, 2014

(51) Int. Cl.
*B60D 1/18*    (2006.01)
*B60D 1/06*    (2006.01)
*B60D 1/58*    (2006.01)

(52) U.S. Cl.
CPC   *B60D 1/187* (2013.01); *B60D 1/06* (2013.01); *B60D 1/58* (2013.01)
USPC ...................................................... 280/457

(58) Field of Classification Search
CPC .............. B60D 1/28; B60D 1/58; B60D 1/06; B60D 1/52
USPC ................. 280/457, 491.5, 511, 901
See application file for complete search history.

(56) References Cited

U.S. PATENT DOCUMENTS

| | | | |
|---|---|---|---|
| 2,635,892 A | 4/1953 | Shutter | |
| 2,713,501 A | 7/1955 | Peak | |
| 2,998,982 A * | 9/1961 | Brazil | 280/457 |
| 3,125,355 A * | 3/1964 | Snuggins | 280/457 |
| 3,827,722 A * | 8/1974 | Miller et al. | 280/432 |
| 4,926,621 A | 5/1990 | Torras | |
| 5,145,199 A * | 9/1992 | Howard | 280/495 |
| 5,246,244 A * | 9/1993 | Colibert | 280/495 |
| 5,362,084 A * | 11/1994 | Edwards | 280/457 |
| 5,465,991 A * | 11/1995 | Kass et al. | 280/457 |
| 5,566,965 A * | 10/1996 | Applegate | 280/500 |
| 5,918,896 A * | 7/1999 | Jenkins, Jr. | 280/457 |
| 5,971,418 A * | 10/1999 | Lindenman et al. | 280/491.1 |
| 6,332,626 B1 | 12/2001 | Morrill | |
| 6,695,338 B1 * | 2/2004 | Roberts | 280/491.5 |
| 7,540,524 B2 | 6/2009 | Viaud | |
| 7,637,525 B2 * | 12/2009 | Rightmire | 280/480 |
| 8,272,662 B2 | 9/2012 | Mccoy et al. | |
| 8,414,009 B2 | 4/2013 | Stanifer et al. | |

* cited by examiner

*Primary Examiner* — Kevin Hurley
(74) *Attorney, Agent, or Firm* — McDonald Hopkins LLC

(57) ABSTRACT

A safety chain bracket assembly is shown and described. The safety chain bracket may include a tubular sleeve adapted to attach with a hitch socket of a towing hitch, the tubular sleeve including an aperture configured to receive a hitch ball, and a bracket body engaged with the tubular sleeve, where pivoting the bracket body selectively locks the bracket body with the tubular sleeve. The safety chain bracket may also include at least one wing member extending from the bracket body, the wing member configured to operably receive a safety chain.

24 Claims, 5 Drawing Sheets

REMOVABLE GOOSENECK HITCH SAFETY CHAIN BRACKET

FIELD OF INVENTION

The present invention generally relates to safety chain bracket for a towing vehicle and more particularly to a removable gooseneck hitch safety chain bracket.

BACKGROUND

There are many different types of hitches utilized to connect a towing vehicle with a towed vehicle, such as a trailer. These hitches attach the towed vehicle with the towing vehicle in a variety of ways, depending on the type of hitch, towed vehicle, or towing vehicle. Some of the most common types of hitches include gooseneck, fifth wheel, rear mount, and the like. Towed vehicles are often connected to a towing vehicle by way of a ball hitch secured to the towing vehicle and a ball socket coupling mechanism on the towed vehicle mounted over the ball. This configuration allows the towed vehicle to pivot behind the towing vehicle.

The ball hitch of some hitches, such as a gooseneck, for example, is commonly mounted in the load bed of the towing vehicle near the longitudinal centerline of the load bed. This may help distribute the weight of the towed vehicle generally evenly between the tires on sides of the towing vehicle. Gooseneck hitches are often attached to the frame of the towing vehicle under the load bed or attached on the load bed of the towing vehicle. In those gooseneck hitches attached to the frame of the towing vehicles, at least one hole is usually cut in the load bed of the towing vehicle for insertion of the hitch ball.

The hitch balls in gooseneck hitches are typically removable or retractable so that when the gooseneck hitch is not in use, the hitch ball may be removed or retracted. This may generally prevent obstruction of use of the load bed when the gooseneck hitch is not in use. With primary emphasis placed on storing/removing the hitch assemblies and hitch balls to avoid obstructions within the load bed of the towing vehicle, convenient placement of maintenance fittings have generally been overlooked.

Safety chains are often utilized with gooseneck hitches to provide a secondary means of connection between the rear of the towing vehicle and the front of the towed vehicle. In order to secure the safety chain, the towing vehicle utilizes some sort of safety chain attachment device. These safety chain attachment devices, however, often obstruct the load bed of the towing vehicle when the hitch is not being used. One solution is to drill additional holes in a load bed of the towing vehicle, and secure a safety chain attachment device to part of the gooseneck hitch attached below the load bed. However, drilling additional holes in the load bed is not always desirable.

A need, therefore, exists for a safety chain attachment device that is removable from the load bed of the towing vehicle when not in use, is easy to operate, and does not require additional holes to be made in the load bed of the towing vehicle.

SUMMARY OF THE PRESENT INVENTION

A safety chain bracket assembly is shown and described. The safety chain bracket may include a tubular sleeve adapted to attach with a hitch socket of a towing hitch, the tubular sleeve including an aperture configured to receive a hitch ball, and a bracket body engaged with the tubular sleeve, where pivoting the bracket body selectively locks the bracket body with the tubular sleeve. The safety chain bracket may also include at least one wing member extending from the bracket body, the wing member configured to operably receive a safety chain.

A safety chain bracket assembly may include a tubular sleeve insertable into a hitch socket of a towing hitch, the tubular sleeve configured to selectively receive a hitch ball, and a bracket body selectively engaged with the tubular sleeve. The safety chain bracket may also include an engaging member extending angularly from the bracket body away from the tubular sleeve, the engaging member configured to operably receive a safety chain.

A gooseneck hitch coupler may include a hitch ball socket adapted to attach with a load bed of a towing vehicle, a tubular sleeve inserted into the hitch socket, the tubular sleeve including a cavity, and a hitch ball member selectively inserted into the cavity of the tubular sleeve. The gooseneck hitch coupler may also include a bracket body selectively engaged with the tubular sleeve, the bracket body free of engagement with the hitch ball, and an engaging member extending angularly from the bracket body, where the engaging member is configured to operably receive a safety chain.

A safety chain bracket may include a bracket body configured to selectively engage a hitch assembly secured to a frame of a towing vehicle below a load bed of the towing vehicle. The safety chain bracket may also include an engaging member extending angularly from the bracket body away from the load bed, the engaging member configured to operably receive a safety chain.

BRIEF DESCRIPTION OF THE DRAWINGS

Operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
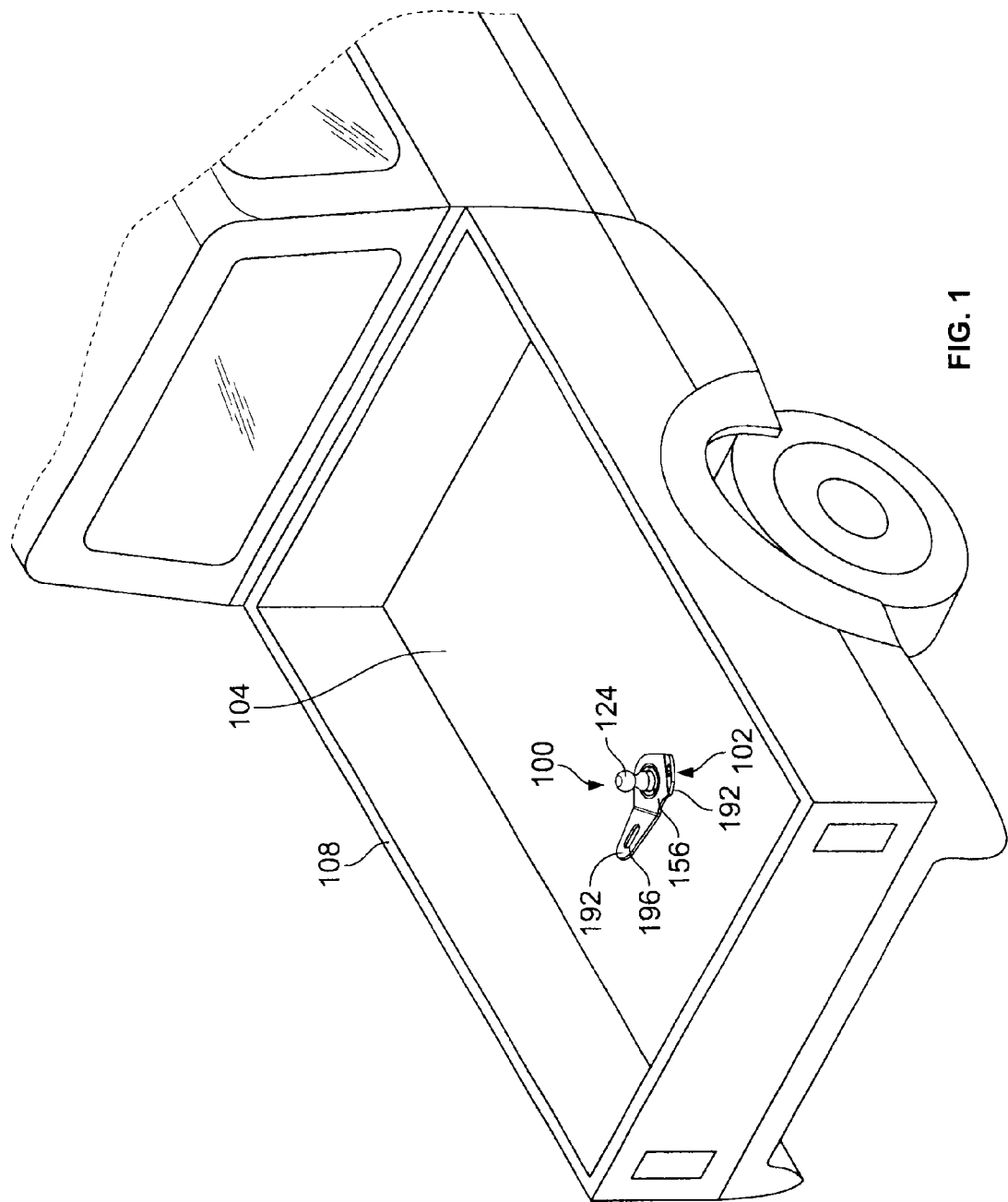
FIG. 1 is a perspective view of a removable safety chain bracket operatively coupled with a hitch assembly on a towing vehicle.

A removable safety chain bracket assembly 100 shown in FIG. 1. The removable safety chain bracket assembly 100 may be constructed to securely and removably anchor down a safety chain used with a trailer hitch—such as a gooseneck hitch. The removable safety chain bracket assembly 100 may be of any appropriate shape or size in addition to those shown in the figures and may have a streamlined design and appearance that may be aesthetically pleasing. The removable safety chain bracket assembly 100 may be used with any appropriate trailer hitch mounting system, and is not limited to the gooseneck hitch shown. The removable safety chain bracket assembly 100 may be removably secured to a hitch receiver 102 on load bed 104 of a towing vehicle 108 in any appropriate manner. By way of a non-limiting example, removable safety chain bracket assembly 100 may be selectively secured to the hitch receiver 102 as shown and described as being part of an under bed gooseneck hitch mounting system shown and described in U.S. Patent Application Serial Number 20100109285, which is hereby incorporated by reference.

Figure 4:
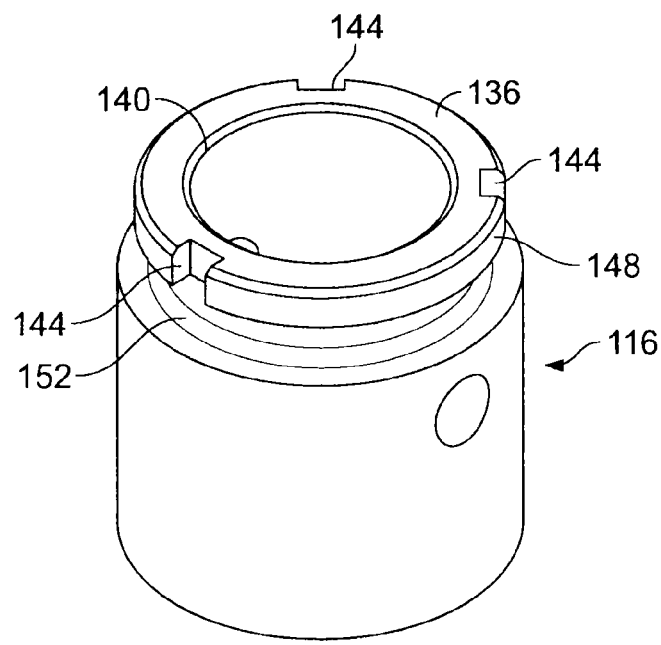
FIG. 4 is a perspective view of embodiments of a ball sleeve.
Figure 5:
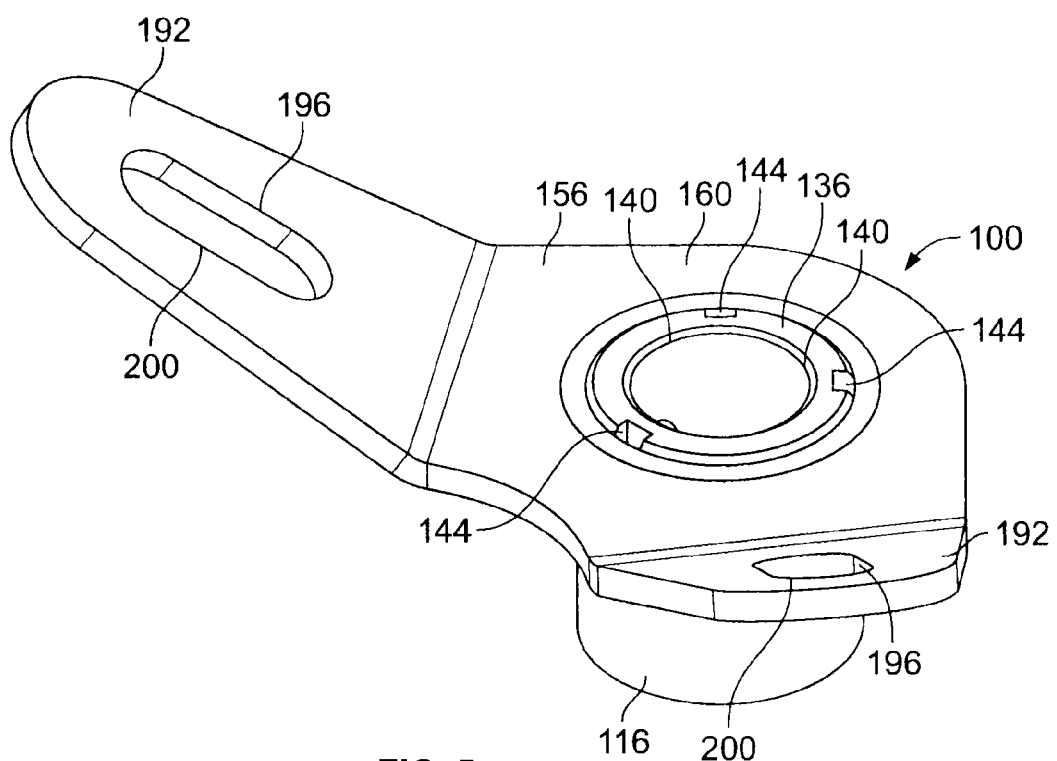
FIG. 5 is a perspective view of embodiments of the removable safety chain bracket operatively secured with the ball sleeve.
Figure 8:
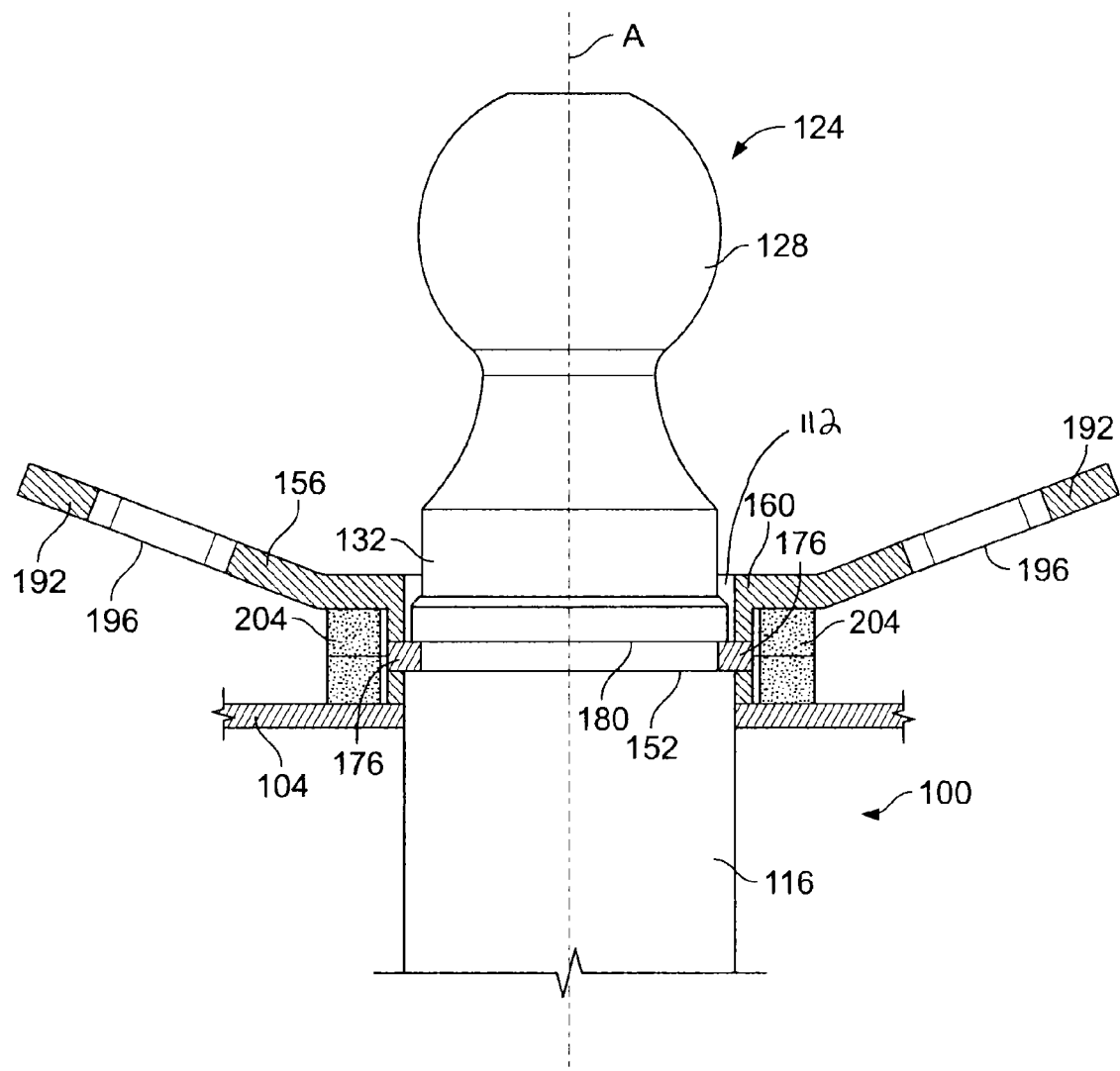
FIG. 8 is a cross-sectional view of the removable safety chain bracket operatively coupled with a hitch assembly on a towing vehicle.

In such embodiments, the removable safety chain bracket assembly 100 may be insertable into a socket 112 of the under bed hitch mounting system. The removable safety chain bracket assembly 100 may include a generally tubular ball sleeve 116, such as shown in FIGS. 4, 5 and 8. The ball sleeve 116 may be attached with the socket 112 in any appropriate manner, including by way of a non-limiting example, by welding the ball sleeve 116 to the socket 112. The ball sleeve 116 may include an aperture 140 configured to operatively accept a hitch ball assembly 124. The hitch ball assembly 124 may include a ball member 128 and a body 132. The ball member 128 may be shaped to receive a corresponding socket (not shown) of a towed vehicle, such as a gooseneck coupler. It is to be understood that the ball member 128 may be of any appropriate or conventional shape and size in the towing field. The ball sleeve 116 may operatively accept the body 132 of the hitch ball assembly 124 such that the hitch ball assembly 124 may be operatively connected with the socket of the towed vehicle.

The ball sleeve 116 may include a generally planar top surface 136. The top surface 136 may, when the ball sleeve 116 is attached with the socket 112, be generally planar with the load bed 104 of the towing vehicle 108. In some embodiments, the top surface 136 may be generally axially above or below the load bed 104 of the towing vehicle 108, but in close proximity thereto. The ball sleeve 116 may include at least one aperture 140. The aperture 140 may be configured to accept a locking member (not shown) of the hitch ball assembly 124 to selectively secure the hitch ball assembly 124 with the hitch receiver 102.

The ball sleeve 116 may further include at least one notch 144 and a collar 148 extending generally below the notch 144. As shown in FIG. 4, the ball sleeve 116 may include three notches 144. However, while three notches 144 are shown, any appropriate number of notches may be used without departing from the present teachings. The notches 144 may be positioned at any appropriate location along the ball sleeve 116. By way of a non-limiting example, two notches 144 may be positioned approximately 90 degrees from one another shown as V in FIG. 2 and the third notch 144 may be positioned approximately 135 degrees from the other two notches 144 shown as Z in FIG. 2. However, the present teachings are not limited to this configuration. The collar 148 may include an annular groove 152 positioned immediately below the notches 144.

The removable safety chain bracket assembly 100 may include a bracket member 156 that may be selectively secured to hitch 102. Specifically, the bracket member 156 may attach with the ball sleeve 116 and not the hitch ball assembly 124. The bracket member 156 may selectively attach with the ball sleeve 116 in any appropriate manner.

The bracket member 156 may include a central portion 160 having a generally planar portion 164. The generally planar portion 164 may be generally planar with the load bed 104 of the towing vehicle 108. In some embodiments, the generally planar portion 164 may be generally axially above or below the load bed 104 of the towing vehicle 108, but in close proximity thereto.

An aperture 168 may be formed in the central portion 160. A tubular collar member 172 may extend from an underside of the central portion 160 generally circumscribing the aperture 168. The tubular collar member 172 may strengthen the removable safety chain bracket assembly 100 by providing additional material. The aperture 168 may be sized to operatively fit over the ball sleeve 116.

The bracket member 156 may also include at least one tab 176. By way of a non-limiting example, the bracket member 156 may include three tabs 176. However, while three tabs 176 are shown, any appropriate number of tabs may be used without departing from the present teachings. In some embodiments, the number of tabs 176 may correspond directly with the number of notches 144. The tabs 176 may be of a mating shape and size to that of the notches 144 such that the tabs 176 may be configured to pass through the notches 144.

Figure 2:
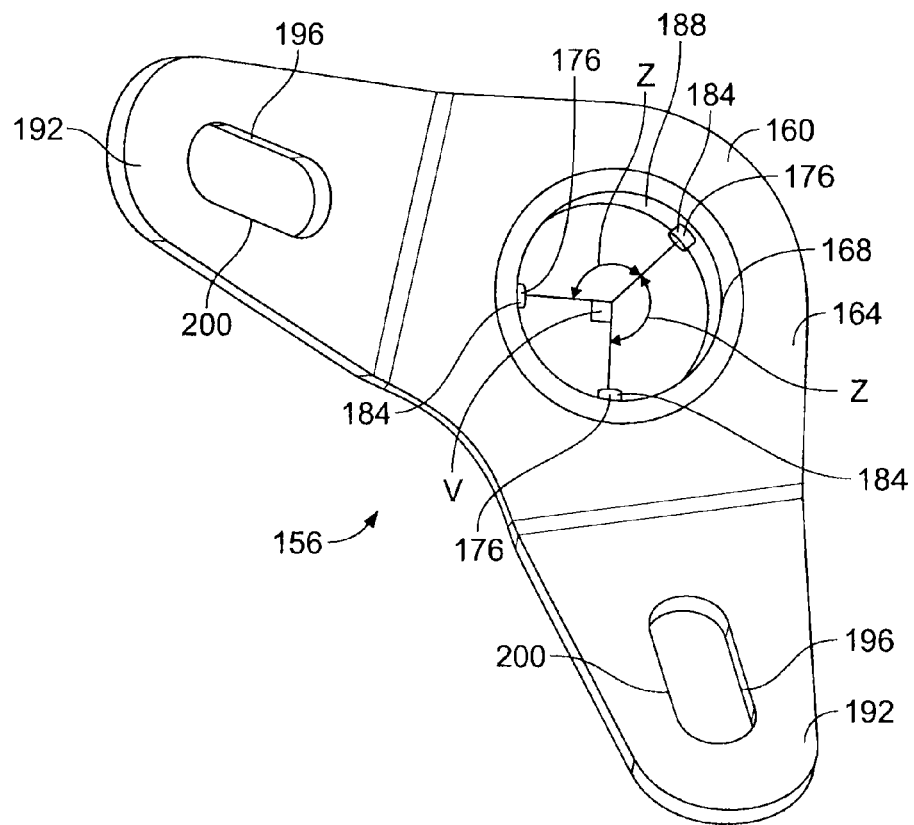
FIG. 2 is a top view of embodiments of a removable safety chain bracket of a FIG. 1.
Figure 3:
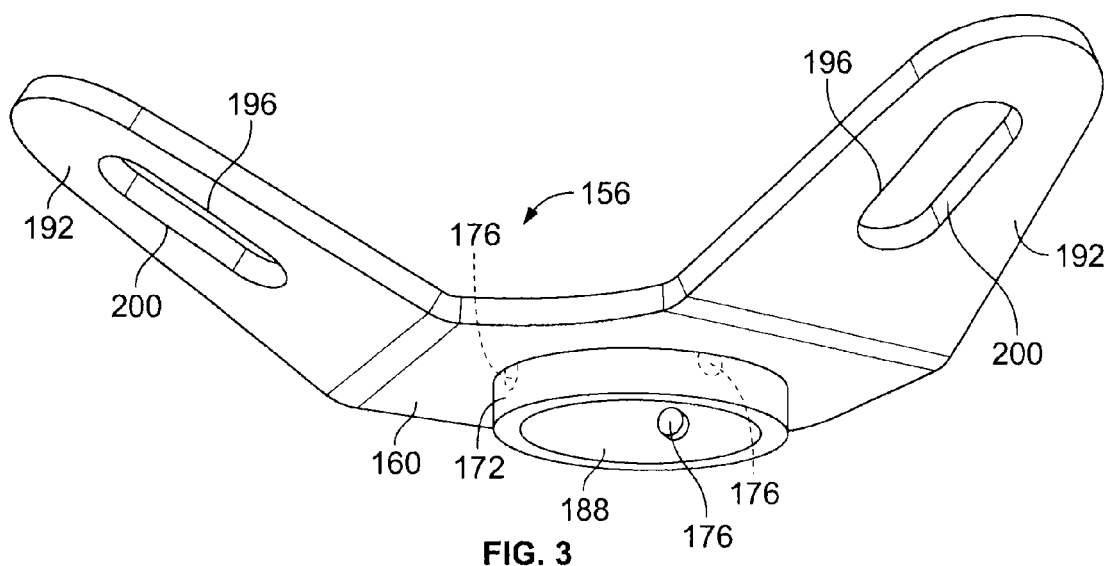
FIG. 3 is a side view of embodiments of a removable safety chain bracket.

As shown in FIGS. 2 and 3, the tabs 176 may include a plurality of pins 184 welded onto an interior surface 188 of the aperture 168. The present teachings, however, are not limited to the tabs 176 being welded to the interior surface 188. In other embodiments, the tabs 176 may be fastened, adhered, formed as a monolithic unit, or a combination of such procedures. The tabs 176 may be positioned along the interior surface 188 of the aperture 168 in any appropriate manner. By way of a non-limiting example, two of the tabs 176 may be spaced generally about 90 degrees from each other along the interior surface 188 of the aperture 168. The third tab 176 may be positioned approximately 135 degrees from the other of the two tabs 176. It should be understood, however, that the present teachings are not limiting to this configuration, any appropriate configuration may be used.

The mounting bracket 156 may further include at least one engaging or wing member 192 that may extend from the central portion 160. In some embodiments, the mounting bracket 156 may include two engaging members 192. However, while two engaging members 192 are shown and described, any number of engaging members may be used, including, without limitation, one, three, four, etc. As shown in FIGS. 1 and 3, the engaging members 192 may extend angularly from central portion 160. Specifically, the engaging members 192 may extend at angularly upward, i.e., angularly up from the load bed 104. The angularly extending engaging members 192 may, when the removable safety chain bracket assembly 100 is attached with the hitch receiver 102, create space between the removably safety chain bracket assembly 100 and the load bed 104. Therefore, when a safety chain is attached with the removable safety chain bracket assembly 100, there may be space between the safety chain and the load bed 104. This may generally prevent contact between the safety chain and the load bed 104, which may generally prevent damage to the load bed 104 during operation.

The engaging members 192 may include an engaging portion 196 configured to have attached thereto a safety chain. In some embodiments, the engaging portion 196 may include at least one aperture 200 formed in the engaging members 192. The apertures 200 may be shaped and sized to accept a safety chain so as to selectively attach the safety chain with the removable safety chain bracket 100. While an aperture 200 may be shown and described as the engaging portion 196, the present teachings are not limited to such. Any appropriate engaging member 196 may be used, including, without limitation, a hook member, a looped member, a slot or any combination of such.

As shown in FIG. 8, the removable safety chain bracket assembly 100 may further include a gasket 204 that may be positioned between the load bed 104 and the bracket member 156. The gasket 204 may be made of any appropriate material, including, without limitation an elastomeric material, such as rubber or the like. The gasket 204 may provide dampening during operation of the removable safety chain bracket assembly 100 and may further protect the load bed 104 during operation thereof.

In operation, the user may selectively attach the removable safety chain bracket assembly 100 to the hitch receiver 102 in the load bed 104 of the towing vehicle 108. In such embodiments, the ball sleeve 116 may be inserted into the socket 112 in any appropriate manner. By way of a non-limiting example, the ball sleeve 116 may be welded into the socket 112, but may also otherwise be connected therewith. The user may then position the bracket member 156 in an operative position with the ball sleeve 116. Specifically, the user may generally align the aperture 168 of the mounting bracket 156 with the ball sleeve 116.

The user may then generally align the tabs 176 with the notches 144 and may lower the mounting bracket 156 passed the top surface 136 of the ball sleeve 116. Once passed the top surface 136, the bracket member 156, or more specifically the tabs 176, may be positioned in the groove 152 as shown in FIG. 8. Once positioned within the groove 152 under the collar 148, the bracket member 156 may be rotated relative to the axis A, until the tabs 176 become misaligned with the notches 144. By way of a non-limiting example, the bracket member 156 may be rotated approximately 180 degrees locking the bracket member 156 with the ball sleeve 116. The tabs 176 may act as the primary retaining member and the collar 148 may act as a secondary retaining member. Further, the bracket member 156 may be positioned such that the engaging members 192 and specifically the engaging portion 196 may be operatively positioned with respect to the towing vehicle 108 to accept a safety chain. This may operatively secure the bracket member 156 with the ball sleeve 116. The tabs 176 may engage an underside portion 180 of the collar 148. This engagement may prevent the bracket member 156 from moving axially upward from the ball sleeve 116 relative to the axis A.

Once appropriately positioned, the user may operatively insert the hitch ball assembly 124 into the ball sleeve 116. Although, the user may insert the hitch ball assembly 124 before attaching the bracket member 156. Once attached, the hitch ball assembly 124 may operatively accept for attachment a socket from a towed vehicle. The towing vehicle 108 and the removable safety chain bracket assembly 100 may be in position to tow a towed vehicle. Once positioned, a safety chain may be inserted into and through the apertures 200 of the bracket member 156 and the towing vehicle 108 may be prepared to tow the towed vehicle. In these embodiments, the bracket member 156 is not attached with the hitch ball assembly 124. It is instead attached to the hitch receiver 102 through the ball sleeve 116. Moreover, the bracket member 156 is attached to and locked with the ball sleeve 116 without the use of tools further simplifying the attachment process.

Additional embodiments of a removable safety chain bracket assembly according the present teachings are described below. In the descriptions, all of the details and components may not be fully described or shown. Rather, the features or components are described and, in some instances, differences with the above-described embodiments may be pointed out. Moreover, it should be appreciated that these other embodiments may include elements or components utilized in the above-described embodiments although not shown or described. Thus, the descriptions of these other embodiments are merely exemplary and not all-inclusive nor exclusive. Moreover, it should be appreciated that the features, components, elements and functionalities of the various embodiments may be combined or altered to achieve a desired removable safety chain bracket assembly without departing from the spirit and scope of the present invention.

A removable safety chain bracket assembly 300 may include a bracket member 356 that may be selectively secured to hitch 102. Specifically, the bracket member 356 may attach with the ball sleeve 116 and not the hitch ball assembly 124. The bracket member 356 may selectively attach with the ball sleeve 116 in any appropriate manner.

The bracket member 356 may include a central portion 360 having a generally planar portion 364. The generally planar portion 364 may be generally planar with the load bed 104 of the towing vehicle 108. In some embodiments, the generally planar portion 364 may be generally above or below the load bed 104 of the towing vehicle 108, but in close proximity thereto.

An aperture 368 may be formed in the central portion 360. A tubular collar member 372 may extend from an underside of the central portion 360 generally circumscribing the aperture 368. The tubular collar member 372 may strengthen the removable safety chain bracket assembly 300. The tubular collar member 372 may be attached with the bracket member 356 by any appropriate manner. By way of non-limiting examples, the tubular collar member 372 may be welded to the bracket member 356 or may be formed as a monolithic unit.

The aperture 368 may be sized to operatively fit over the ball sleeve 116. The bracket member 356 may include at least one tab 376. The bracket member 356 may include three tabs 376. However, while three tabs 376 are shown, any appropriate number of tabs may be used without departing from the present teachings. In some embodiments, the number of tabs 376 may correspond directly with the number of notches 144. The tabs 376 may be of a mating shape and size to that of the notches 144 such that the tabs 376 may be configured to pass through the notches 144.

Figure 6:
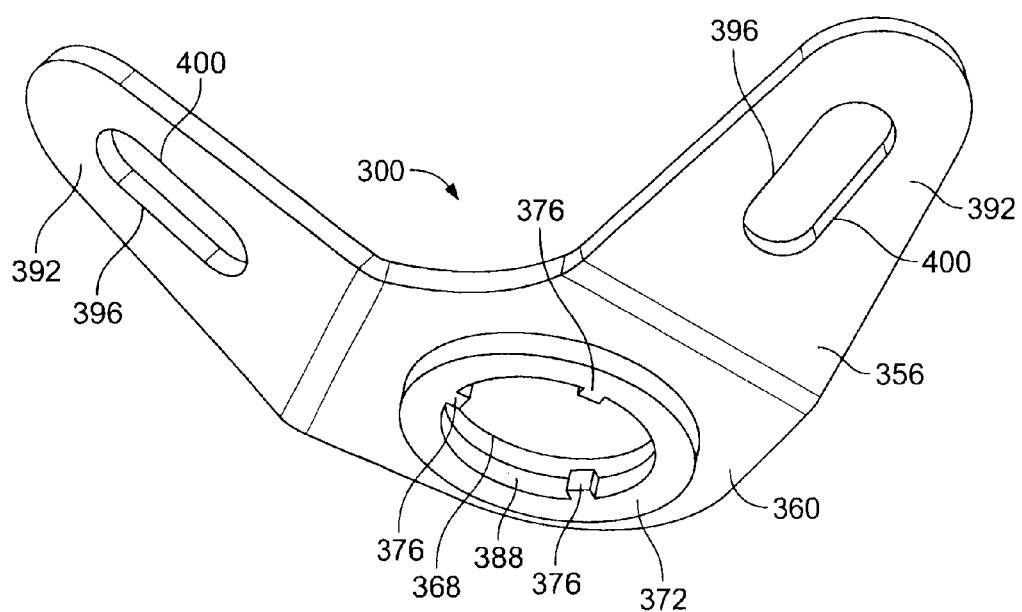
FIG. 6 is a bottom perspective view of embodiments of a removable safety chain bracket.
Figure 7:
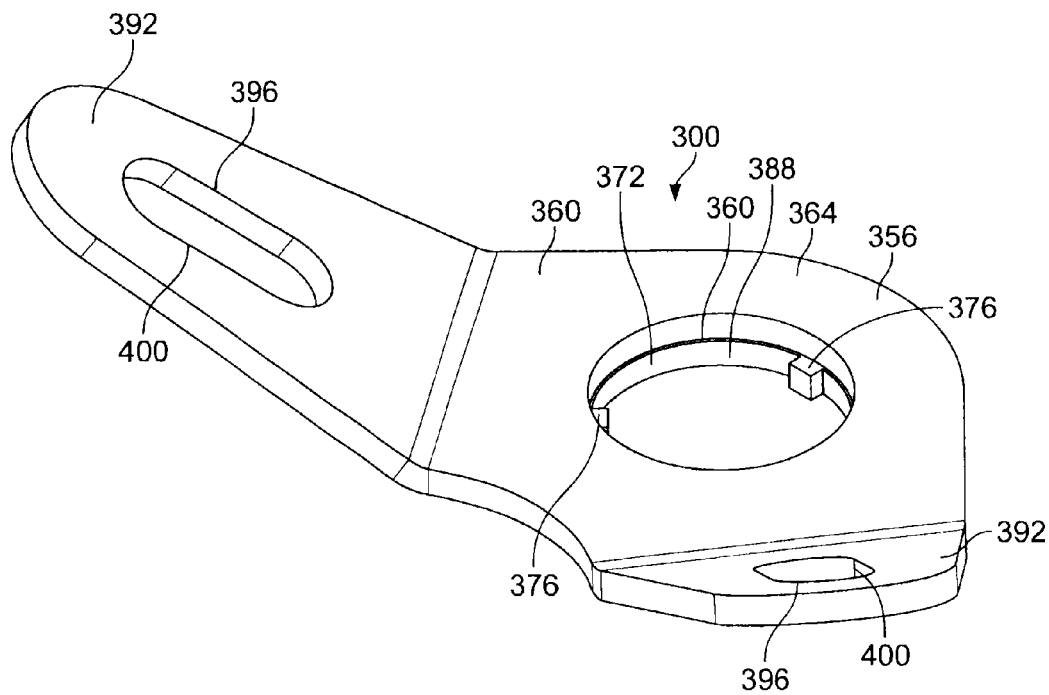
FIG. 7 is a top perspective view of embodiments of a removable safety chain bracket.

As shown in FIGS. 6 and 7, the tabs 376 may be attached with the collar 372. The tabs 376 may be formed with the collar 372 as a monolithic unit or may be attached in a subsequent operation in any appropriate manner. By way of a non-limiting example, the tabs may be welded onto an interior surface 388 of the collar 372. The present teachings, however, are not limited to the tabs 376 being welded to the interior surface 388. In other embodiments, the tabs 376 may be fastened, or adhered. The tabs 376 may be positioned along the interior surface 388 of the collar 372 in any appropriate manner. By way of a non-limiting example, two of the tabs 376 may be spaced generally about 90 degrees from each other along the interior surface 388 of the collar 372. The third tab 376 may be positioned approximately 135 degrees from the other of the two tabs 376. It should be understood, however, that the present teachings are not limiting to this configuration, any appropriate configuration may be used.

The mounting bracket 356 may further include at least one engaging or wing member 392 that may extend from the central portion 360. In some embodiments, the mounting bracket 356 may include two engaging members 392. However, while two engaging members 392 are shown and described, any number of engaging members may be used, including, without limitation, one, three, four, etc. As shown in FIGS. 6 and 7, the engaging members 392 may extend angularly from central portion 360. Specifically, the engaging members 392 may extend at an angularly upward, i.e., up from the load bed 104. The angularly extending engaging members 392 may, when the removable safety chain bracket assembly 300 is attached with the hitch receiver 102, create space between the removably safety chain bracket assembly 300 and the load bed 104. Therefore, when a safety chain is attached with the removable safety chain bracket 300, there may be space between the safety chain and the load bed 104. This may generally prevent contact between the safety chain and the load bed 104, which may generally prevent damage to the load bed 104 during operation.

The engaging members 392 may include an engaging portion 396 configured to have attached thereto a safety chain. In some embodiments, the engaging portion 396 may include at least one aperture 400 formed in the engaging members 392. The apertures 400 may be shaped and sized to accept a safety chain so as to selectively attach the safety chain with the removable safety chain bracket 300. While an aperture 400 may be shown and described as the engaging portion 396, the present teachings are not limited to such. Any appropriate engaging member 396 may be used, including, without limitation, a hook member, a looped member, a slot or any combination of such.

Although the preferred embodiment of the present invention has been illustrated in the accompanying drawings and described in the foregoing detailed description, it is to be understood that the present invention is not to be limited to just the preferred embodiment disclosed, but that the invention described herein is capable of numerous rearrangements, modifications and substitutions without departing from the scope of the claims hereafter.

Having thus described the invention, I claim:

1. A safety chain bracket assembly comprising:
    a tubular sleeve including an aperture configured to receive a hitch ball;
    a bracket body engaged with the tubular sleeve, wherein pivoting the bracket body selectively locks the bracket body with the tubular sleeve; and
    at least one wing member extending from the bracket body, the wing member configured to operably receive a safety chain.

2. The safety chain bracket assembly of claim 1, wherein the bracket body includes an aperture, the aperture configured to engage with tubular sleeve.

3. The safety chain bracket assembly of claim 2, further comprising at least one notch positioned in the tubular sleeve.

4. The safety chain bracket assembly of claim 3, further comprising at least one tab positioned in the aperture, the at least one tab insertable into the at least one notch.

5. The safety chain bracket assembly of claim 4, wherein the at least one tab prevents movement of the bracket body axially upward from the sleeve member.

6. The safety chain bracket assembly of claim 1, wherein the at least one wing member extends at an angle upward from the bracket body.

7. The safety chain bracket assembly of claim 5, further comprising an engaging portion positioned on the at least one wing, the engaging portion configured to operably receive the safety chain in a position spaced from the tubular sleeve.

8. A safety chain bracket assembly comprising:
    a tubular sleeve adapted for attachment with a load bed of a towing vehicle, the tubular sleeve configured to selectively receive a hitch ball;
    a bracket body selectively engaged with the tubular sleeve, wherein the bracket body is selectively engaged with the tubular sleeve independent of a hitch ball being received in the tubular sleeve; and
    an engaging member extending from the bracket body away from the tubular sleeve, the engaging member configured to operably receive a safety chain.

9. The safety chain bracket assembly of claim 8, wherein pivoting the bracket body on the tubular sleeve locks the bracket body with the tubular sleeve.

10. The safety chain bracket assembly of claim 9, wherein the bracket body is attached with the tubular sleeve free of use of tools.

11. The safety chain bracket assembly of claim 8, wherein the bracket body includes an aperture through which the tubular sleeve passes upon engagement of the bracket body with the tubular sleeve.

12. The safety chain bracket assembly of claim 11, further comprising a plurality of notches positioned in the tubular sleeve.

13. The safety chain bracket assembly of claim 12, further comprising a plurality of tabs positioned in the aperture, the plurality of tabs insertable into the plurality of notches.

14. The safety chain bracket assembly of claim 13, wherein the plurality of tabs prevent movement of the bracket body axially upward from the tubular sleeve.

15. The safety chain bracket assembly of claim 8, wherein the engaging member extends angularly from the bracket body.

16. The safety chain bracket assembly of claim 8, wherein the tubular sleeve is permanently attached with the load bed of the towing vehicle.

17. A gooseneck hitch coupler comprising:
    a tubular sleeve attached with a load bed of a towing vehicle, the tubular sleeve including a cavity;
    a hitch ball member selectively inserted into the cavity of the tubular sleeve;
    a bracket body selectively engaged with the tubular sleeve, the bracket body free of engagement with the hitch ball; and
    an engaging member extending from the bracket body, wherein the engaging member is configured to operably receive a safety chain.

18. The gooseneck hitch coupler of claim 17, wherein the bracket body includes an aperture through which the tubular sleeve passes upon engagement of the bracket body with the tubular sleeve.

19. The gooseneck hitch coupler of claim 18, further comprising a collar extending from the bracket body, the collar generally aligned with and circumscribing the aperture.

20. The gooseneck hitch coupler of claim 19, further comprising a plurality of notches positioned in the tubular sleeve.

21. The gooseneck hitch coupler of claim 20, further comprising a plurality of tabs positioned on the collar, the plurality of tabs insertable into the plurality of notches.

22. The gooseneck hitch coupler of claim 21, wherein the plurality of tabs prevent movement of the bracket body axially upward from the tubular sleeve.

23. A safety chain bracket comprising:
a bracket body configured to selectively engage a hitch assembly secured to a frame of a towing vehicle below a load bed of the towing vehicle; and
an engaging member extending from the bracket body away from the load bed, the engaging member configured to operably receive a safety chain, wherein the engaging member is secured to the towing vehicle independent of a hitch ball being attached with the hitch assembly.

24. The safety chain bracket assembly of claim 17, wherein the engaging member extends angularly from the bracket body.

\* \* \* \* \*